(12) United States Patent
Herron et al.

(10) Patent No.: US 6,656,361 B1
(45) Date of Patent: Dec. 2, 2003

(54) MEMBRANE ASSISTED EVAPORATION PROCESS AND DEVICE FOR BRINE CONCENTRATION

(75) Inventors: Jack Herron, Corvallis, OR (US); Robert Salter, Corvallis, OR (US)

(73) Assignee: Osmotek, Inc., Albany, OR (US)

( * ) Notice: Subject to any disclaimer, the term of this patent is extended or adjusted under 35 U.S.C. 154(b) by 190 days.

(21) Appl. No.: 09/688,611

(22) Filed: Oct. 15, 2000

(51) Int. Cl.[7] .................................................. C02F 1/44
(52) U.S. Cl. .................. 210/640; 644/649; 644/321.75; 644/175; 95/43; 95/45; 96/4; 96/6
(58) Field of Search ................................ 210/640, 644, 210/649, 321.75, 175; 95/43, 45; 96/4, 6

(56) References Cited

U.S. PATENT DOCUMENTS

| | | | | |
|---|---|---|---|---|
| 3,617,547 A | * | 11/1971 | Halff | |
| 4,476,024 A | * | 10/1984 | Cheng | |
| 4,953,694 A | * | 9/1990 | Hayashi et al. | |
| 4,988,525 A | * | 1/1991 | Gresch | |
| 5,464,540 A | * | 11/1995 | Friensen et al. | |
| 5,582,735 A | * | 12/1996 | Mancusi, III et al. | |
| 5,681,433 A | * | 10/1997 | Friensen et al. | |
| 6,187,196 B1 | * | 2/2001 | Way et al. | |
| 6,383,391 B1 | * | 5/2002 | Ehrenberg et al. | |

* cited by examiner

*Primary Examiner*—Ana Fortuna
(74) *Attorney, Agent, or Firm*—Jeffrey B. Oster

(57) ABSTRACT

There is disclosed a membrane assisted evaporation process (MAE) for economically and reliably removing water added to brine. The process comprises using low-grade waste heat and air to evaporate water from diluted salt brines when the water moves across a membrane in a liquid state.

14 Claims, 3 Drawing Sheets

MEMBRANE ASSISTED EVAPORATION PROCESS AND DEVICE FOR BRINE CONCENTRATION

TECHNICAL FIELD OF THE INVENTION

The present invention provides a membrane assisted evaporation process (MAE) for economically and reliably removing water added to brine. The process comprises using low-grade waste heat and air to evaporate water from diluted salt brines when the water moves across a membrane in a liquid state.

BACKGROUND OF THE INVENTION

Salt caverns have been used for storage of oil, particularly crude oil. When oil is to be pumped out of a salt cavern, a brine solution is pumped in to replace the oil. The brine concentrations are preferably within the range of 14 to 22.5% (by weight) of salt (mostly NaCl). However, the brine is stored in ponds and the ponds can take in rain water that results in a net dilution of the brine with pure water. The effect of diluted brine is a slow destruction of the salt caverns through removal of salt from the walls and eventual collapse of the caverns. Therefore, there is a need in the art to remove water from holding salt ponds that gets into such ponds from rain water and concentrate the brine to near saturation.

For example, salt caverns adjacent to a refinery in Ontario, Canada and in Texas each annually takes in about 150,000 barrels (38 gallons) of rainwater per year on average. This refinery can either develop a process to remove water from the brine ponds to near saturation or build indoor pool holding tanks to prevent rainwater dilution. Previous attempts at brine regeneration have attempted to use ultra-filtration membranes and specifically hydrophobic membranes (e.g., polysulfone) in a pervaporation or membrane distillation-type process. The pervaporation or membrane distillation process uses a hydrophobic membrane and heat to drive water in the vapor phase from the heated brine side to the permeate side. Water is vaporized in the heated brine and migrates across the membrane still in the gas phase to the permeate side driven by a vacuum. Generally, salt is rejected by the membranes and as a result, crystals form on the brine side and foul the membrane. In another approach (U.S. Pat. No. 4,316,774) the air is heated on the permeate side but this is wasted because air (unlike a liquid) cannot hold much heat. Significant problems with membrane fouling have been encountered and the membrane wetting and fouling prevented vapor from permeating into the membrane, effectively shutting down the process.

The need of concentrating diluted brine solutions arises in petroleum storage facilities in st caverns as indicated above. However, similar processes are needed for brine recovery for the chloralkali industry and for treating cooling tower blowdown waste water.

Therefore, there is a need to develop concentration techniques using membranes that can further concentrate brine to near saturation without local crystallization on the membrane from the high salt concentrations and without utilization of significant amounts of energy in an evaporation process at such high boiling points (due to the high salt concentration). The needed membrane should also be able to resist hydrolysis caused by heat, high pH and cleaning solutions as it will operate in harsh and caustic conditions. The inventive membrane and processes address such needs.

SUMMARY OF THE INVENTION

The present invention provides an osmotic membrane evaporation process (OME) for removing water from brine to further concentrate the brine to near saturation. The process for concentrating diluted feed of brine or other aqueous solution for concentration comprising:

(a) providing a hydrophilic membrane having a rejection property of 500 kDa cutoff or lower having a first side designed to be in contact with diluted feed, and having a second side designed to be in contact with air, wherein the hydrophilic membrane is not able to reject salt;

(b) pumping the diluted feed at a temperature of from about 10° C. to about 100° C. across the first side of the hydrophilic membrane while blowing an air stream or other gas across the second side of the hydrophilic membrane; and (c) removing water from the diluted feed by evaporating the water into the air stream blown across the second side of the hydrophilic membrane.

Preferably, the hydrophilic membrane is an asymmetric hydrophilic membrane further comprising a fabric layer on the second side of the membrane to provide mechanical strength for the membrane. Most preferably, the fabric is polyester net, having about 60% open area and about 0.07 mm thick. Preferably, the fabric is a silkscreen material. Preferably, the hydrophilic membrane is made from a cellulose material or polyvinyl alcohol. Most preferably, the cellulose material is selected from the group consisting of cellulose acetate, cellulose diacetate, cellulose triacetate, cellulose acetate butyrate, cellulose acetate, proprionate, and combinations thereof.

Preferably, the diluted feed is heated using any available heat source to a temperature of from about 10° C. to about 95° C. Most preferably, the diluted feed is heated to a temperature from about 50° C. to about 95° C. Preferably, the air stream on the second side of the membrane is blown at a velocity of from about 5 cm/sec to about 100 m/sec. Most preferably, the velocity of air across a membrane is about 100 cm/sec.

The present invention further provides a device for osmotic membrane evaporation and brine or other aqueous concentration (feed), comprising:

(a) a hydrophilic membrane having a first side and a second side, having a rejection property of 500 kDa cutoff or lower, wherein the hydrophilic membrane is not able to reject salt;

(b) an enclosed feed flow chamber having an inlet and an outlet and defined by communication with the first side of a hydrophilic membrane;

(c) an enclosed air flow chamber having an air flow blowing means adjacent to an inlet and an outlet and defined by the second side of the hydrophilic membrane; and (d) a heating means for the feed located adjacent to the inflow of the brine flow chamber.

Preferably, the hydrophilic membrane is an asymmetric hydrophilic membrane further comprising a fabric layer on the second side of the membrane to provide mechanical strength for the membrane. Most preferably, the fabric is polyester net, having about 60% open area and about 0.07 mm thick. Preferably, the fabric is a silkscreen material. Preferably, the hydrophilic membrane is made from a cellulose material or polyvinyl alcohol. Most preferably, the cellulose material is selected from the group consisting of cellulose acetate, cellulose diacetate, cellulose triacetate, cellulose acetate butyrate, cellulose acetate proprionate, and combinations thereof.

DETAILED DESCRIPTION OF THE INVENTION

Osmotic Membrane Evaporation Process and Device

Figure 1:
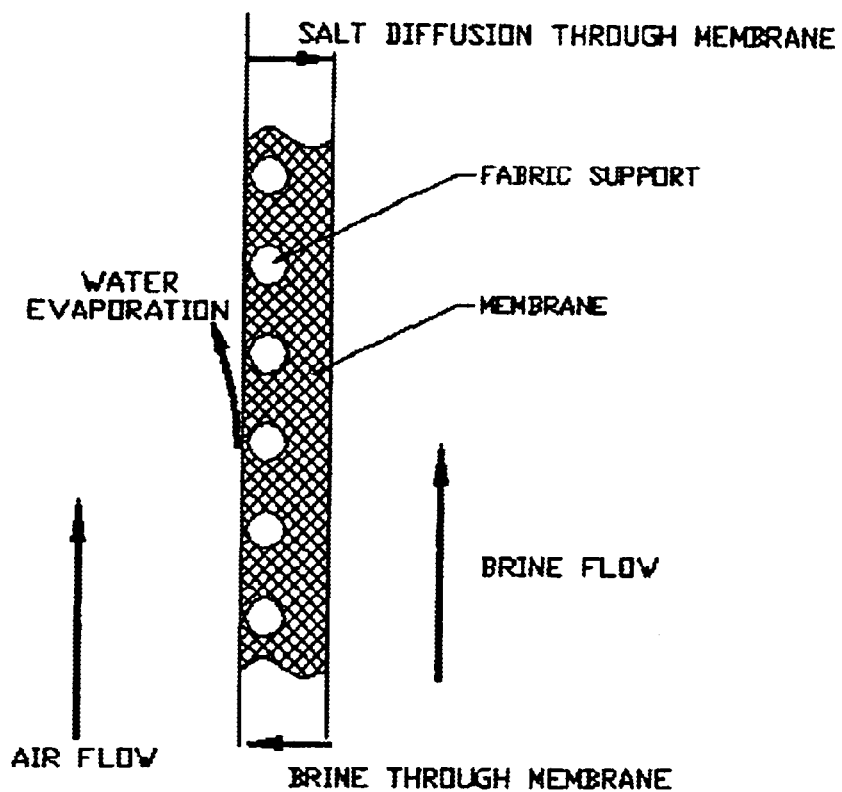
FIG. 1 provides a schematic of the inventive membrane evaporation process wherein water in a liquid state (with salt) from a diluted brine solution crosses a membrane from the first side to the second side through absorbtivity and is evaporated into an air stream located on the second side of the membrane.

The inventive membrane evaporation process is a significant improvement over pervaporation or membrane distillation process. One difference is that the present invention uses a hydrophilic membrane as opposed to the hydrophobic (polypropylene or PTFE (i.e., Teflon)) membrane required to be used in the pervaporation process. Another difference is that water vapor is driven across the membrane in pervaporation driven by the pressure gradients of water vapor through the pores in the membrane caused by the vacuum. Thus, a vapor pressure gradient drives the separation of water from salt as water is vaporized on the feed side of the hydrophobic membrane and drawn to the colder side as vapor. Low vapor pressures and microscopic pore diameters cause the flux in pervaporation to be slow. The present inventive process, by contrast allows for water in a liquid state (and salt) transport across a hydrophilic membrane, such that the water evaporates directly into the air stream. Since the brine flow is heated, water is picked up by the cooler air that gets heated by contact with the membrane, allowing the air to hold more water. High air flows improve the water evaporation rate because evaporation is driven by heat transfer through the membrane and the most heat transfer occurs when the largest temperature differential occurs between the brine and the air. There is no vacuum pump as the air is blown across the second side of the hydrophilic membrane. In the inventive process, near saturation, salt crystals will form on the second side of the hydrophilic membrane indicating that the hydrophilic membrane is not rejecting salt. The crystals form when the water evaporates into the air flow on the second side of the membrane. The salt crystal formation is reversed when the air flow is temporarily turned off and the salt redisolves and diffuses back into the brine. The membrane thickness without support layer is in the range from 10 to 300 $\mu$m, in particular from 20 to 120 $\mu$m, and ideally 0.1 mm thick.

The inventive process and device uses a hydrophilic membrane. In a preferred embodiment, the hydrophilic membrane is a cellulose-based membrane with ultrafiltration (UF) or tighter rejection properties. It is important to use a hydrophilic membrane (in contrast to standard pervaporation processes that routinely use a hydrophobic membrane) because water transfers across the membrane as a liquid and evaporates from the back or second side of the membrane in an air stream. The evaporation is driven by heat transferred through from the feed solution being evaporated. Thus, the limiting resistance is heat transferred through the hydrophilic membrane. For this reason, a heat conductive membrane material, such as cellulose, even cellulose triacetate, is preferred. In fact, the more heat that can be transferred across the membrane, coupled with faster air flows across the second side of the membrane will allow for faster evaporation and accelerating the process for brine concentration. Hydrophobic membranes, such as those used in pervaporation processes, are too thermally insulating to be useful for the present osmotic membrane evaporation process. Moreover, it is important to keep air flow on the second side of the membrane as high as possible A hydrophilic membrane is further important for the inventive process and device because in many applications there are trace amounts of substances that will quickly foul hydrophobic membranes, requiring them to be frequently cleaned. In contrast, hydrophobic membranes will operate with infrequent cleanings in solutions containing a variety foulants such as fats, oils, proteins, parafins and other organics. In any salt evaporation process, as the solution approaches saturation salt crystal formation can hinder evaporation and cause frequent shut downs and cleanings. This is why cooling towers cannot make saturated brine solutions as they will rapidly cake up and collapse. Evaporators, even those made from expensive non-corrosive components, also cake up. In the inventive process, salt crystals can form on the second side of the membrane, but this crystalization can be reversed by the process of turning off air flow. Moreover, the salt concentration on the second side of the membrane is hydroscopic and will help to pull water through the membrane.

The benefits of the inventive process and inventive device are illustrated in the following example.

EXAMPLE 1

Figure 2:
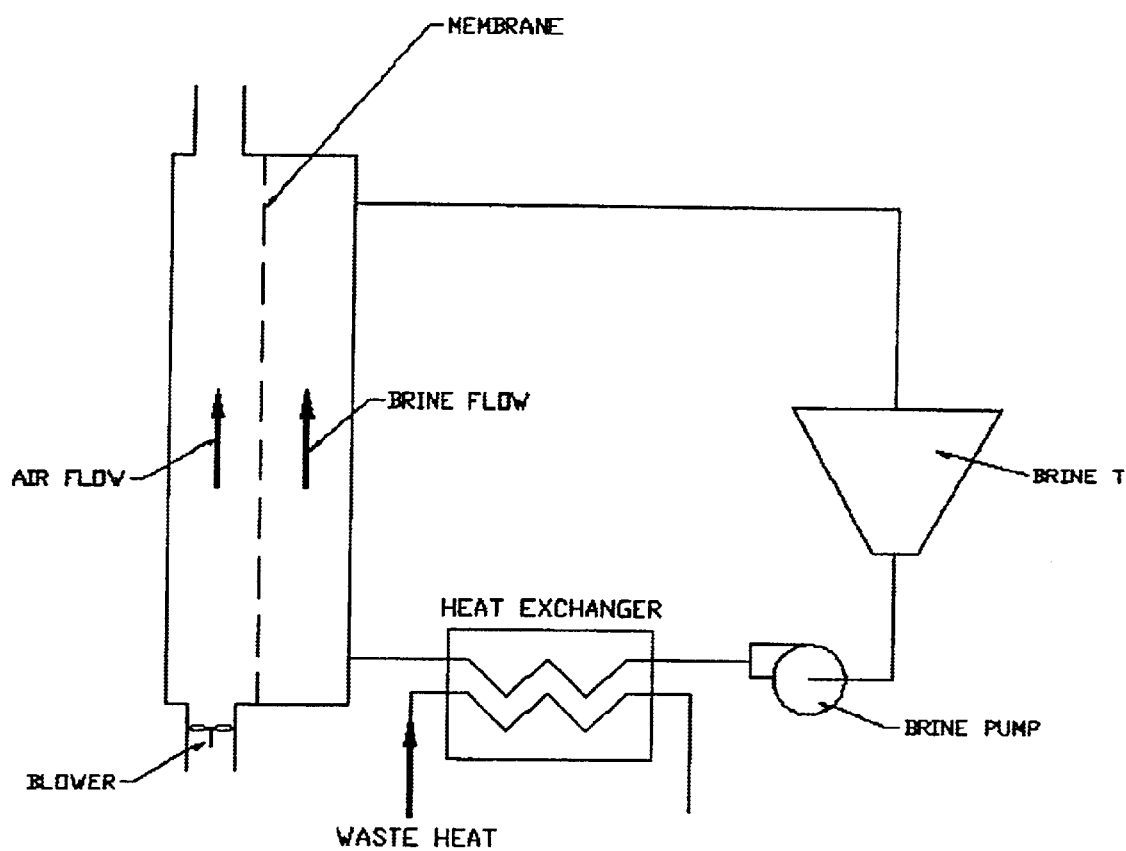
FIG. 2 shows an overall schematic showing the membrane structure of FIG. 1 on the left side and where air flow is generated by a blower and a heat exchanger to capture and reuse excess heat.

This example provides the results of a study to reduce brine volume at a salt cavern associated with a refinery. The salt caverns at Refinery "X" annually take on about 150,000 barrels of rainwater. Refinery X needs a process to remover rainwater from the brine. The brine concentrations range from 14 to 22.5% NaCl by weight. A bench scale test was run and used to estimate the costs for rainwater removal from the brine in terms of capital costs and operating costs (electricity and membrane replacement). In a bench scale set up (FIG. 2), showing the brine (feed) recirculated first through a heat exchanger and then passed an osmotic membrane evaporation module and finally back to a tank. The amount of water evaporated is calculated by recording tank level changes with time. Ambient (room) air is used and blown by a bench-scale regenerative blower on the second side of the osmotic membrane, where the water evaporates. Energy for the process was provided by a set-point-controlled electrical resistance heater that heated a recirculating loop. The heated water loop transferred its heat energy to the circulating brine in a heat exchanger.

In this experiment, three types of membranes were evaluated, one formulated for high flux, one formulated for long life and one formulated for both high flux and long life. All three membranes were cast onto high-flux cloth backing. Different brine temperatures (43, 60 and 77° C.) were tested by adjusting the water loop temperature. The airflow rate was set to full flow of about 0.66 m$^3$/min at STP or half flow of 0.33 m$^3$/min. In addition to brine levels in the tank, the collected volume of condensate, degrees brix of the brine sample (20 degrees brix is equivalent to 17.5 weight % NaCl), degrees brix of the collected condensate, brine temperatures and pressures in and out of the membrane module, brine flow rates, air flow rates and air temperatures. The flux of the overall process was calculated by dividing the change in tank level in liters by the time in hours between readings (often 30 min) and then dividing by the membrane area (0.33 m²). This calculated flux is represented by LMH or liters of water transferred per square meter of membrane each hour. Alternatively, GFD is calculates and this is gallons of water transferred per square foot of membrane of membrane each 24 hour day. The conversion is 1.000 LMH=0.589 GFD. The flux was checked by the energy balance about the module. Thus the energy to evaporate the water (water evaporation rate times latent heat of vaporization) is approximately equal to the energy lost from the brine (brine flow rate times specific heat times temperature drop from the inlet to the outlet).

Figure 3:
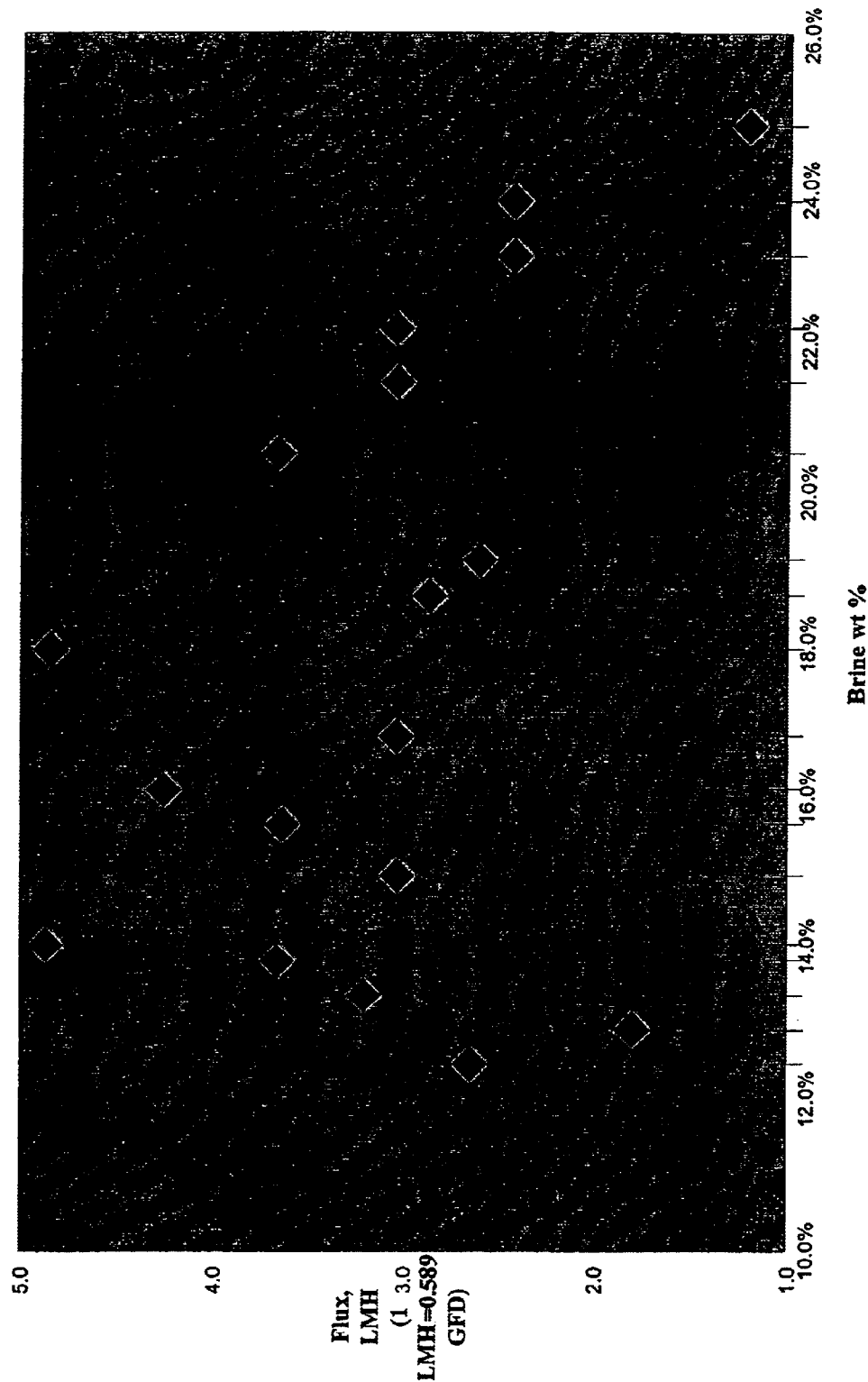
FIG. 3 shows a graph of flux rates for brine solutions at increasing concentrations as provided in example 1.

The flux from multiple runs with varying temperatures and membranes being used is shown graphically in FIG. 3. The values in FIG. 3 are the averages of the fluxes at each of the conditions described on the abscissa. In general, the flux increased as the temperature increased and the flux decreased as the air flow rate decreased. The scatter of the data at 77° C. was most likely due to the brine nearing or exceeding its saturation point (26 wt % at 20° C.) As the brine approached saturation, salt would begin to crystallize on the second side or air side of the membrane. The crystallized salt increased mass-transfer resistance for the water to reach the evaporation interface and it increased the heat-transfer resistance through the membrane, which kept the evaporation surface from cooling too much. What is important is that the crystallized salt re-dissolved within minutes after turning off the fan.

These data enables the appropriate process parameters and sizing of an industrial sized device and process for brine concentration to be built and implemented. Similar applications can be configured with the foregoing bench-top device using different feed sources for concentration.

We claim:

1. A process for concentrating diluted feed or brine or other aqueous solution for concentration comprising:
   (a) providing a hydrophilic membrane having a rejection property of 500 kDa cutoff or lower having a first side designed to be in contact with diluted feed, and having a second side designed to be in contact with air, wherein the hydrophilic membrane is not able to reject salt;
   (b) pumping the diluted feed at a temperature of from about 10° C. to about 100° C. across the first side of the hydrophilic membrane while blowing an air stream or other gas across the second side of the hydrophilic membrane; and
   (c) removing water from the diluted feed by evaporating the water into the air stream blown across the second side of the hydrophilic membrane.

2. The process for concentrating diluted feed of claim 1 wherein the hydrophilic membrane is an asymmetric hydrophilic membrane further comprising a fabric layer on the second side of the membrane to provide mechanical strength for the membrane.

3. The process for concentrating diluted feed of claim 2 wherein the fabric is a polyester screen.

4. The process for concentrating diluted feed of claim 1 wherein the hydrophilic membrane is made from a cellulose material or polyvinyl alcohol.

5. The process for concentrating diluted feed of claim 4 wherein the cellulose material is selected from the group consisting of cellulose acetate, cellulose diacetate, cellulose triacetate, cellulose acetate butyrate, cellulose acetate proprionate, and combinations thereof.

6. The process for concentrating diluted feed of claim 1 wherein the diluted feed is heated using any available heat source to a temperature of from about 10° C. to about 95° C.

7. The process for concentrating diluted feed of claim 6 wherein the diluted feed is heated to a temperature from about 50° C. to about 95° C.

8. The process for concentrating diluted feed of claim 1 wherein the air stream on the second side of the membrane is blown at a velocity of from about 5 cm/sec to about 100 m/sec.

9. The process for concentrating diluted feed of claim 8 wherein the velocity of air across a membrane is about 100 cm/sec.

10. A device for osmotic membrane evaporation of brine or other aqueous concentration (feed), comprising:
    (a) a hydrophilic membrane having a first side and a second side, having a rejection property of 500 kDa cutoff or lower, wherein the hydrophilic membrane is not able to reject salt;
    (b) an enclosed feed flow chamber having an inlet and an outlet and defined by communication with the first side of a hydrophilic membrane;
    (c) an enclosed air flow chamber having an air flow blowing means adjacent to an inlet and an outlet and defined by the second side of the hydrophilic membrane; and
    (d) a heating means for the feed located adjacent to the inflow of the brine flow chamber.

11. The device for osmotic membrane evaporation of claim 10 wherein the hydrophilic membrane is an asymmetric hydrophilic membrane further comprising a fabric layer on the second side of the membrane to provide mechanical strength for the membrane.

12. The device for osmotic membrane evaporation of claim 11 wherein the fabric is a polyester fabric or screen.

13. The device for osmotic membrane evaporation of claim 10 wherein the hydrophilic membrane is made from a cellulose material or polyvinyl alcohol.

14. The device for osmotic membrane evaporation of claim 13 wherein the cellulose material is selected from the group consisting of cellulose acetate, cellulose diacetate, cellulose triacetate, cellulose acetate butyratecellulose acetate proprionate, and combinations thereof.

* * * * *